United States Patent
Arsanjani et al.

(10) Patent No.: US 11,025,488 B1
(45) Date of Patent: Jun. 1, 2021

(54) INTELLIGENT NETWORK OPERATIONS FOR DATA COMMUNICATIONS BETWEEN CLIENT-SPECIFIC SERVERS AND DATA-CENTER COMMUNICATIONS SERVERS

(71) Applicant: 8x8, Inc., Campbell, CA (US)

(72) Inventors: Ali Arsanjani, Campbell, CA (US); Bryan R. Martin, Campbell, CA (US); Manu Mukerji, Campbell, CA (US); Venkat Nagaswamy, Campbell, CA (US); Marshall Lincoln, Campbell, CA (US)

(73) Assignee: 8x8, Inc., Campbell, CA (US)

( * ) Notice: Subject to any disclaimer, the term of this patent is extended or adjusted under 35 U.S.C. 154(b) by 0 days.

(21) Appl. No.: 16/235,941

(22) Filed: Dec. 28, 2018

(51) Int. Cl.
*H04L 12/24* (2006.01)
*H04W 24/02* (2009.01)
*H04W 24/08* (2009.01)
*H04L 29/08* (2006.01)
*H04W 48/18* (2009.01)

(52) U.S. Cl.
CPC ........ *H04L 41/0816* (2013.01); *H04L 41/083* (2013.01); *H04L 41/142* (2013.01); *H04L 41/147* (2013.01); *H04L 67/2833* (2013.01); *H04L 67/327* (2013.01); *H04W 24/02* (2013.01); *H04W 24/08* (2013.01); *H04W 48/18* (2013.01)

(58) Field of Classification Search
CPC . H04L 41/0816; H04L 41/083; H04L 41/147; H04L 41/142; H04L 67/2833; H04L 67/327; H04W 24/02; H04W 24/08; H04W 48/18
See application file for complete search history.

(56) References Cited

U.S. PATENT DOCUMENTS

| | | | |
|---|---|---|---|
| 7,979,840 B2 | 7/2011 | Zhang et al. | |
| 8,316,347 B2 | 11/2012 | Arsanjani et al. | |
| 8,332,813 B2 | 12/2012 | Arasanjani et al. | |
| 8,739,111 B2 * | 5/2014 | Allam .................... | G06Q 10/06 717/102 |
| 8,874,755 B1 | 10/2014 | Deklich et al. | |

(Continued)

*Primary Examiner* — Michael A Keller
(74) *Attorney, Agent, or Firm* — Crawford Maunu PLLC

(57) ABSTRACT

Certain aspects of the disclosure are directed to context aggregation in a data communications network. According to a specific example, user-data communications between a client-specific endpoint device and the other participating endpoint device during a first time period can be retrieved from a plurality of interconnected data communications systems. The client station can be configured and arranged to interface with a data communications server providing data communications services on a subscription basis. Context information for each respective user-data communication between the client station and the participating station during the first time period can be aggregated, and operational statistics from network circuitry providing the user-data communications between the client station and the participating station can be retrieved. Network parameters can be configured to change performance of subsequent user-data communications between the client station and the participating station, based on patterns identified in the operational statistics and the aggregated context information.

20 Claims, 5 Drawing Sheets

(56) References Cited

U.S. PATENT DOCUMENTS

| | | | |
|---|---|---|---|
| 9,171,319 B2 | 10/2015 | Qu et al. | |
| 9,213,564 B1* | 12/2015 | Klein | G06F 9/45533 |
| 10,394,975 B2* | 8/2019 | Kim | G06Q 10/06 |
| 2004/0064517 A1* | 4/2004 | Uenoyama | H04L 69/329 |
| | | | 709/207 |
| 2004/0122245 A1 | 6/2004 | Franks | |
| 2008/0027784 A1 | 1/2008 | Ang et al. | |
| 2015/0243155 A1* | 8/2015 | Xiong | H04B 10/0795 |
| | | | 398/135 |
| 2017/0257303 A1* | 9/2017 | Boyapalle | H04L 67/34 |
| 2018/0324041 A1 | 11/2018 | Deklich et al. | |
| 2019/0012251 A1* | 1/2019 | Khosrowpour | G06F 11/3409 |
| 2019/0243836 A1* | 8/2019 | Nanda | G06F 16/258 |
| 2019/0327130 A1* | 10/2019 | Huang | H04L 41/147 |
| 2019/0342718 A1* | 11/2019 | Pylappan | H04W 4/023 |

* cited by examiner

INTELLIGENT NETWORK OPERATIONS FOR DATA COMMUNICATIONS BETWEEN CLIENT-SPECIFIC SERVERS AND DATA-CENTER COMMUNICATIONS SERVERS

OVERVIEW

Aspects of various embodiments are directed to attempting to unpack and interpret massive amounts of information in data communications. Particular embodiments are directed toward methods for use in verbal and typed data communications systems employing a data communications server operated by a communications provider, where the data communications server is on the data communications provider side, to provide data communications services to a multitude of client entities. A data communications endpoint device can use a broadband Internet connection to connect to a data communications server that is managed by a data communications service provider. The data communications server can handle communication routing and provide other data communications services for the data communications endpoint device. Such server(s) operating on behalf of data-communications service providers, provide users access to managed databases and/or services over the high throughput mediums. Non-limiting examples of data-communications service providers include ISPs (Internet Service Providers) and various other companies which provide Internet-related services such as email and search-engine services and more specialized computer-based services such as staffing software service, information technology management service, and/or customer relationship management services.

Computing servers are increasingly being used to provide various data communications services over a network including, but not limited to, routing of Voice over Internet Protocol (VoIP) communications and/or more generally, for providing data communications services such as messaging, video conferencing, management of data communications exchange servers, packet switching, traffic management, website hosting, remote data storage, remote computing services, and management of virtual computing environments, among other examples.

SUMMARY

Various example embodiments are directed to issues such as those addressed above and/or others which may become apparent from the following disclosure concerning data systems and methods for changing network performance settings in a data communications network.

Certain of these example embodiments are directed to an apparatus comprising a management circuit configured and arranged to correlate communications-specific characteristics of user-data communications involving at least one client station among a plurality of remotely-situated client stations with a particular context and a data-center communications server configured and arranged to provide data communications services to the client stations. In such embodiments, the data-center communications server is configured and arranged to aggregate context information for each respective user-data communication between a client station among the plurality of client stations and a participating station, retrieve operational statistics from network circuitry providing the user-data communications between the client station and the participating station, and configure network parameters to change performance of subsequent user-data communications between the client station and the participating station, based on patterns identified in the operational statistics and the aggregated context information. By correlating aspects of the data communication, such as key words, phrases, and/or tone with an overall context of the data communication, subsequent user-data communications can be optimized by configuring network parameters, based on the aggregated context information, thereby improving the level of service and communication provided.

Other example embodiments are directed to techniques for automated aggregation of context information derived from a data communications network, and configuration of network parameters based on such aggregated context information. Such automated systems or networks can facilitate data communications routing, providing proactive monitoring approaches to rapidly assess the content, classification, severity, sentiment and/or topic of data communications and to intelligently change network operations settings involving the client entity and the other party, based on the aggregated context information.

Certain of these example embodiments are directed toward methods for use in communications systems employing a data communications server operated by a communications provider, where the data communications server is on the data communications provider side, to provide data communications services to a multitude of client entities. In such systems, the data-center communications server includes one or more computer processor circuits (configured with access to databases stored in memory circuits) configured to act as a communications-control engine for routing, processing communications and/or providing related communications services on behalf of client entities. Such client entities may be exemplified as businesses with employees ranging in number from just a few to thousands, and being located/mobile for communications services in any of a multitude of venues.

In accordance with other related aspects the context of the relationship (e.g., the communications) between the client entity and another party, may be determined using an automated algorithm, such that with added use, thresholds for determining a context of the relationship become more defined with a larger data set.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which.

Figure 1:
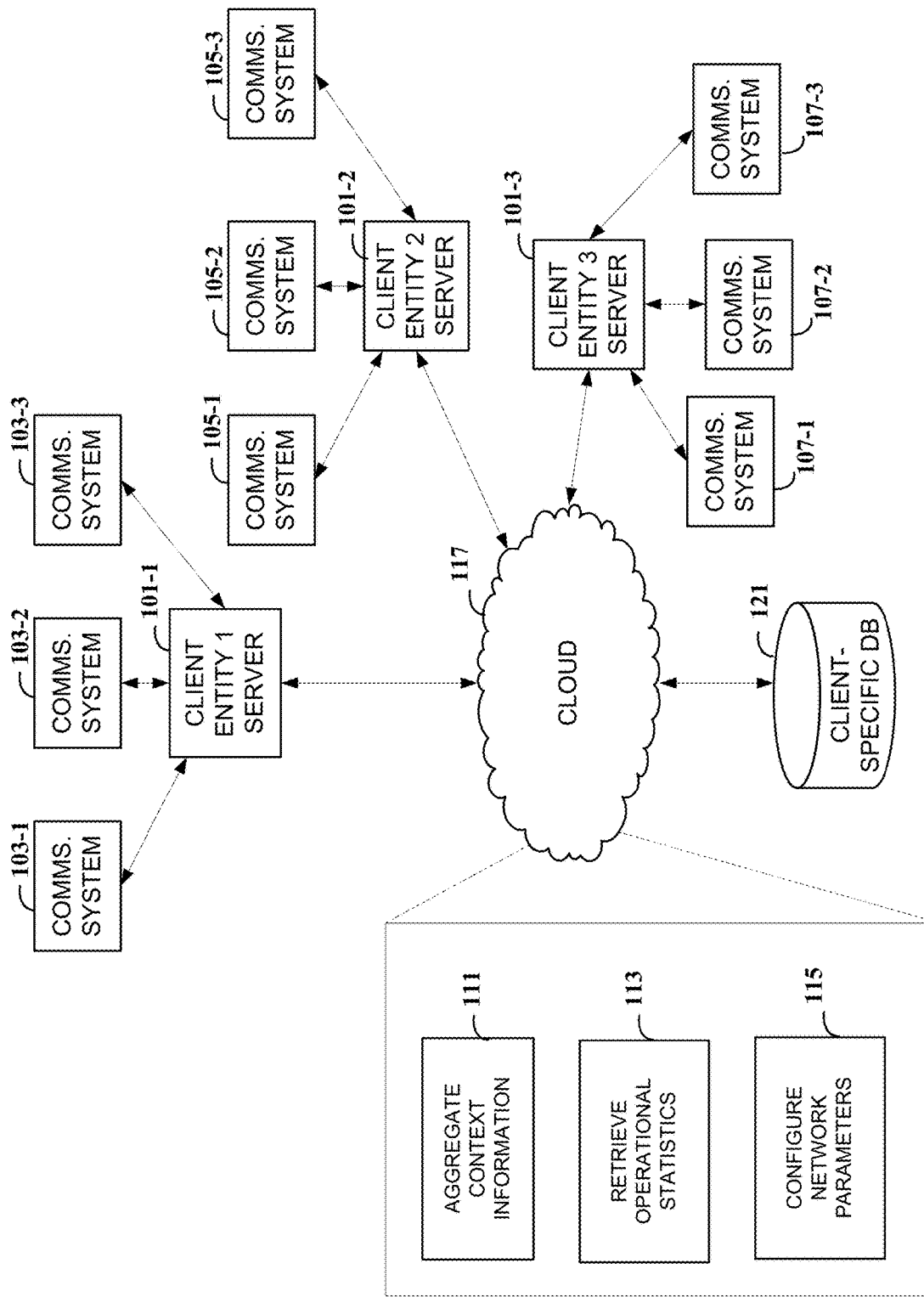
FIG. 1 illustrates a block diagram of an example system for intelligent network operations in a data communications network, consistent with the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are applicable to a variety of different types of apparatuses, systems and methods involving a data communications network serving disparate businesses or client entities. In certain implementations, aspects of the present disclosure have been shown to be beneficial when used in the context of providing data communications services. While the present disclosure is not necessarily limited to such data communications systems as described herein, for purposes of facilitating understanding and appreciation of certain embodiments, the following discussion uses such data communications-based services and systems in the context and on behalf of communications platforms of client entities which subscribe to such services from a data communications service provider (with a server).

Example embodiments are directed toward methods for use in communications systems employing a data communications server operated by a communications provider, where the data communications server is on the data communications provider side, to provide data communications services to a multitude of client entities. For instance, the data communications server can enable and facilitate data communications sessions each involving a client-specific endpoint and another participating endpoint, where the client-specific endpoint is associated with a client-entity among the plurality of remotely-situated client entities. In such contexts, the data communications server may be referred to as a data-center communications server. In such systems, the data-center communications server includes one or more computer processor circuits (configured with access to databases stored in memory circuits) configured to act as a communications-control engine for routing, processing communications and/or providing related communications services on behalf of client entities. Such client entities may be exemplified as businesses with employees ranging in number from just a few to thousands, and being located/mobile for communications services in any of a multitude of venues. Each such data communications session can include transmission and receipt of data communications between at least two endpoints, as hosted (e.g., provided) by the data communications server.

Accordingly, example embodiments of the present disclosure are directed to techniques for using machine learning-based algorithms for context aggregation in a data communications network. This machine learning-based data communications routing system can provide a proactive monitoring embodiment to rapidly assess the content, classification, severity, sentiment and/or topic of data communications and create predictive models for received data communications. Certain proactive monitoring embodiments of the present disclosure collect data into an event timeline, indicating events that transpired in previous data communications between a client entity and another party (e.g., individual and/or organization), as well the context of each of the previous data communications. Such contexts can be representative of a sentiment between the client entity and the party, and/or the health of the relationship between the client entity and the party. By correlating aspects of the data communication, such as key words, phrases, tone, and/or other recognizable features and correlating such features with the overall context of the data communication, predictive models can be created, stored, and selectively accessed for the future data communications between the parties.

Particularly, embodiments of the present disclosure are directed to techniques for context aggregation in a data communications network. User-data communications between a client entity and another party can be retrieved from a plurality of interconnected data communications systems. In such embodiments, the client entity can be one of a plurality of remotely-situated client entities each respectively subscribing to and receiving data communications services from a data communications server. The user-data communications can include various data communications services over a network including, but not limited to, routing of VoIP communications and/or for providing communications services such as messaging, video conferencing, management of data communications exchange servers, packet switching, traffic management, website hosting, remote data storage, remote computing services, and management of virtual computing environments, among other examples. To determine the context of the relationship (e.g., the communications) between the client entity and the other party, machine learning and/or artificial intelligence can be implemented, such that with added use, thresholds for determining the context of the relationship become more defined with a larger data set.

As an illustration, a data-center communications server can enable and facilitate each of a plurality of user-based data communications sessions, in which each data communications session involves a client-specific endpoint and another participating endpoint. The client-specific endpoint can be associated with a client entity (e.g., client station such as CPU connected/enabled for communications over the Internet) among a plurality of remotely-situated client entities each respectively configured and arranged to interface with the data-center communications server. The other participating endpoint can be associated with a participating entity (e.g., participating station) external to the client entity and configured and arranged to interface with the data-center communications server. Information relating to user-data communications between a client entity and another party can be retrieved from a plurality of data communications systems. The communications can be historical communications corresponding with a defined period of time which has already passed. Each of the user-data communications retrieved corresponds with some form of communication between the client entity and a particular party, and each user-data communication retrieved can be retrieved from a data communications system providing at least one data communications service to the client entity. For instance, a client entity ABC company may have an email service, a chat service, a VoIP service, and a customer relationship management (CRM) service, each of which are provided by the data communications provider. One data communications system can manage the email service, another data communications system can manage the chat service, a different data communications system can manage the VoIP service, and yet another data communications system can manage the CRM service. Examples are not limited to the above mentioned data communications services/systems. In various example embodiments, each of the plurality of interconnected data communications systems can be a CRM system, an email communication system, a product sales system, a text-based communications system, a voice-based communications system, a technological support system, a data monitoring system, and/or external data sources associated with at least one of the client entity and the other party, among others.

To determine the context between ABC Company and Client A, communications between ABC Company and Client A can be retrieved from each of these data communications systems. A context for each communication between ABC Company and Client A can be determined. For instance, a keyword, a phrase, and/or a tone can be identified for each respective user-data communication between the client entity and the other party during this time period, and the context for each respective user-data communication can be determined based on the identified keyword, phrase, and/or tone. A database of relationships between keyword, phrase, tone, topic, etc. and context can be maintained, such that a context can be determined for subsequent communications.

The categories of context information for each respective user-data communication between the client entity and the participating entity can be aggregated, such that a context can be determined for the aggregated user-data communications between the client entity and the other party. Additionally, operational statistics can be retrieved from network circuitry providing the user-data communications between the client station and the participating station, regarding performance of the user-data communications between the client station and the participating station. Once the context information is aggregated and operational statistics are retrieved and/or identified, network parameters can be configured to change (e.g., improve and/or optimize) performance of subsequent user-data communications between the client station and the participating station. For instance, based on patterns identified in the operational statistics and the aggregated context information, the data-center communications server can select a carrier network, select a network device to provide the user-data communications on behalf of a communications service provider, and/or configure selected network devices that are providing the user-data communications on behalf of the communications service provider, in order to change (e.g., improve) the performance of subsequent user-data communications.

While examples herein are described with regards to analyzing speech characteristic parameters, it is noted that the user-data communications can correspond to user-generated audible messages or non-voice user-generated messages. For instance, user-generated audible messages can include voicemails and VoIP calls, and non-voice user-generated messages can include email messages, text messages, and/or chat messages, among others. In example embodiments in which the user-data communication includes a user-generated audible message, a transcript of the user-generated audible message can be created.

In a particular example embodiment, the user-data communications can include a voice communication. For instance, the voice communication can be addressed to a particular client among a plurality of remotely-situated client entities. Each respective client entity can be configured and arranged to interface with a data-center communications server providing data communications services on a subscription basis, and each of the plurality of remotely-situated client entities can be associated with a respective client-managed server. During the voice communication, communications-specific characteristics (e.g., speech characteristic parameters in this illustration) of the voice communication can be analyzed, and a context for the voice communication can be determined based on the analyzed speech characteristic parameters. In various example embodiments, the plurality of speech characteristic parameters can be identified by analyzing at least one of words and tones of voice communications previously received by the plurality of remotely-situated client entities, and correlating the plurality of speech characteristic parameters (e.g., the communications-specific characteristics) with a particular sentiment. A plurality of speech characteristic parameters can be identified by the client entity, such as via a client-managed server, by analyzing words and/or tones of voice communications previously received by the plurality of remotely-situated client entities. The plurality of speech characteristic parameters can be correlated with a particular context, as discussed herein.

In various example embodiments, the data-center communications server can retrieve operational statistics from network circuitry providing the user-data communications between the client station and the participating station. The operational statistics can include information regarding performance of the user-data communications between the client station and the participating station. For instance, the data-center communications server can retrieve operational statistics regarding the performance of the carrier network, and/or the performance of various network devices that provide the user-data communications on behalf of a communications service provider. Additionally and/or alternatively, the data communications server can retrieve measurable communication metrics associated with the user-data communications between the client station and the participating station, including transmission latency, jitter, packet loss, and/or dropped calls.

In various example embodiments, the data-center communications server can correlate the measurable communication metrics with different user-data communication events between the client station and the participating station. The data-center communications server can identify patterns of user-data communication events based on a correlation of measurable communication metrics (e.g., the retrieved operational statistics) with the user-data communication events, and predict operational problems in providing the user-data communications between the client station based on the identified pattern. The data-center communications server can measure communications quality factors for data communications implemented using the data-center communications server, and isolate perceived operational problems associated with input and output circuits from transmission related data communications. Accordingly, the data-center communications server can predict operational problems in providing the user-data communications between the client station and the participating station based on identified patterns.

In various related embodiments, the data-center communications server can configure the network parameters to optimize performance of the subsequent user-data communications in response to the predicted operational problems. For instance, the data-center communications server can predict the operational problems in real-time or near real-time, and configure the network parameters to optimize performance of the subsequent user-data communications in real-time or near real-time. The data-center communications server can select a different carrier network to provide the user-data communications between the client station and the participating station based on the identified patterns. Additionally and/or alternatively, the data-center communications server can select a different network device to provide the user-data communications between the client station and the participating station based on the identified patterns. Moreover, the data-center communications server can modify selection of a carrier network, modify selection of network devices to provide the user-data communications on behalf of a communications service provider, and configuring selected network devices used to provide the user-data communications on behalf of the communications service provider, based on the identified patterns. In various embodiments, the data-center communications server can select different network elements for subsequent data communications using an algorithm that is based upon the aggregated context information and the isolated perceived operational problems.

For instance, the data-center communications server can retrieve operational statistics regarding performance of a carrier network operating to provide the user-data communications between the client station and the participating station, and identify patterns of user-data communication events corresponding to operational problems with the carrier network. As an additional illustration, the data-center communications server can retrieve operational statistics regarding performance of a network device configured and arranged to provide the user-data communications on behalf of a communications service provider, and identify patterns of user-data communication events corresponding to operational problems with the at least one network device.

The data-center communications server can configure network parameters to change performance of subsequent user-data communications between the client station and the participating station, based on patterns identified in the operational statistics and the aggregated context information. For instance, the data-center communications server can configure at least one of: selection of a carrier network, selection of at least one network device to provide the user-data communications on behalf of a communications service provider, and configuration of selected network devices configured and arranged to provide the user-data communications on behalf of the communications service provider.

Once the context for a particular data communication and/or between the client entity and the other party is identified, a set of client-specific communication handling rules can be retrieved from the data-center communications server. Such client-specific communication handling rules can specify a manner in which network parameters are to be configured, thresholds at which such network parameters are to be configured, and various actions that are to be implemented at the server level. For instance, the data-center communications server can be configured to predict an operational problem in providing the user-data communications between the client station and the participating station based on the identified patterns, and to provide an alert to a representative of the client station in response to the predicted operational problem. In various other related exemplary embodiments (alone and/or building on the above aspects), the data-center communications server can predict an operational problem in providing the user-data communications between the client station and the participating station based on the identified patterns, and configure the network parameters based on client-specific preferences of the client station and stored by a management circuit. For instance, the data-center communications server can configure the network parameters responsive to satisfaction of operational statistic thresholds specified by the client-specific preferences. As a further illustration, the data-center communications server can predict an operational problem in providing the user-data communications between the client station and the participating station based on the identified patterns, and provide an alert to a representative of the client station in response to the predicted operational problem (e.g., as specified in the client-specific preferences).

In various example embodiments, thresholds identified via the client entity, such as via a client-managed server, can delineate ranges for a plurality of contexts. In such example embodiments, the context can be represented by a numerical value indicative of an overall sentiment of the data communications, determined by at least one of a frequency of audio of the data communications, a wavelength or velocity of the data communications, an amplitude of the data communications, and topics of the data communications.

In an additional embodiment, an apparatus including a client-specific communications server and a management circuit can determine a context for aggregated user-data communications involving the client entity. In such embodiments, the client-specific communications server can be configured and arranged to route data communications for a plurality of end-users having respective data communication devices. The client-specific communications server can also be configured and arranged to interface with a data-center communications server providing data communications services to a plurality of remotely-situated client entities on a subscription basis, each client entity respectively configured and arranged to interface with the data-center communications server.

The management circuit, as discussed herein, can be configured and arranged to interface with the client-specific communications server and to store context information from a plurality of interconnected data communications systems. The management circuit can be a module associated with a client-specific database and/or a plurality of client-specific databases. Each of the data communications systems can provide at least one of the data communications services to the client entity. In such exemplary embodiments, the client-specific communications server is configured and arranged to determine a context for aggregated user-data communications involving the client entity, by retrieving from the plurality of interconnected data communications systems, a plurality of user-data communications between the client entity and another party, and determining identifiable aspects (e.g., communications-specific characteristics) of each of the plurality of user-data communications. The communications-specific characteristic can be aggregated, such that a context for the plurality of user-data communications can be determined. Based on a comparison of the aggregated communications-specific characteristics and the context information stored in the client-specific database, a context for the plurality of user-data communications (e.g., the aggregated communications) can be identified. Subsequently, user-data communications between the client entity and the other party can be handled in response to the context for the plurality of user-data communications meeting predefined client-specific criteria.

In various embodiments, the client-specific communications server is configured and arranged to determine the context for each user-data communication and/or the aggregated user-data communications by identifying key words in the user-data communication(s). The key words can be identified by analyzing the natural language of the user-data communication(s). Using natural language processing or other word recognition means, the client-specific communications server can determine at least one topic of the user-data communication, and assign a context to the received user-data communication based at least in part on the identified key words.

The communications-specific characteristics can include a tone of the user-data communication, where the tone includes measurable audio parameters such as a frequency of audio in the user-data communication, a wavelength or velocity of the audio in the user-data communication, an amplitude of the audio in the user-data communication, and a combination thereof. In such embodiments, the client-specific communications server can be configured and arranged to determine the context for the user-data communication by identifying the tone of the user-data communication.

In various example embodiments, different actions can be taken by the client-specific communications server in response to identification of a particular context. For instance, the client-specific communications server and/or the data-center communications server providing the data communications, can configure network parameters to change performance of subsequent user-data communications between the client station and the participating station, based on the identified patterns and based on the aggregated context information. As discussed herein, the network parameters can be changed based on client-specific preferences stored in a database maintained by the management circuit.

In a further particular embodiment, an apparatus including a management circuit and a data-center communications server can determine a context for aggregated user-data communications involving the client entity. In such embodiments, a client-specific database can be configured and arranged to correlate identifiable aspects of user-data communications involving at least one client entity among the plurality of remotely-situated client entities with a particular context. The data-center communications server can be configured and arranged to interface with the plurality of remotely-situated client entities and to provide the data communications services to the plurality of remotely-situated client entities on a subscription basis.

In such embodiments, the data-center communications server can be configured and arranged to determine a context for aggregated user-data communications involving the client station and the participating station by retrieving from a plurality of interconnected data communications systems, information relating to user-data communications between the client station and the participating station (e.g., the client entity and another party). Further, the data-center communications server can determine communications-specific characteristics of each of the plurality of user-data communications and aggregate the communications-specific characteristics of the plurality of user-data communications.

The context for the plurality of user-data communications can be determined by the data-center communications server based on a comparison of the communications-specific characteristics and the context information stored in a client-specific database maintained by the management circuit. Subsequently, the data-center communications server can configure network parameters to change performance of subsequent user-data communications between the client station and the participating station, based on the identified patterns and the aggregated context information.

In various other related embodiments, the criteria for assigning a particular context to a user-data communication and/or user-data communications may be dynamic and based at least in part on user feedback. For instance, the communications-specific characteristics of the user-data communications can include a keyword, a tone, and/or a phrase. The data-center communications server can be configured and arranged to determine a context for aggregated user-data communications involving the client entity, by receiving from an end-user associated with the client entity, feedback indicating an extent to which the determined context is accurate. As an illustration involving such feedback, the user may be asked for feedback regarding whether the keywords, tones, and/or phrases identified accurately capture the sentiment of the plurality of user-data communications. Based on the user feedback, a client-specific database for the associated client entity can be updated. Additionally and/or alternatively, the data-center communications server can be configured and arranged to provide to each respective client entity, an option to specify a plurality of communications-specific characteristics that can be identified from user-data communications directed to the respective client entity, and at least one context associated with each of the plurality of communications-specific characteristics. For instance, client entities can specify aspects (e.g., keywords, phrases, topics, tones, etc.) that can be identified from user-data communications directed to the respective client entity, and a context associated with each of the identifiable aspects.

At least one machine learning-based algorithm can assist in the effective and efficient context aggregation in a data communications network. For instance, previous communications between parties can be scaled and/or correlated with a particular context. After the completion of a communication, feedback can be obtained from the communicating parties, which assists in the determination of the overall context of the completed communication. Aspects of the completed communication can then be compared to subsequent communications in order to identify the context of the subsequent communications. Subsequent data-communications can be compared against the previous communications to determine a likely context of the new data-communication.

Various processes can be implemented to determine a context for a particular user-data communication. For instance, the context of the aggregated user-data communications can be based on the topic of the user-data communications, a sentiment of the user-data communications, and/or an identification of an individual or organization which originated the user-data communications, among others. In various embodiments, the context of the aggregated user-data communications can be identified based on previous communications and/or previous interactions with a particular customer. As such, a processing resource communicatively coupled to the data-communications server and/or the client-specific communications server can be configured and arranged to access customer relationship management (CRM) data, and communications services accessed by the plurality of remotely-situated client entities, the communications services including an email system and a text-based chat system. A context of the voice communication can be identified based on the CRM data, information in the email system, or information in the text-based chat system.

In the following description, various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the different diagrams can refer to the same elements, more specific embodiments, or additional instances of the same element. Also, although aspects and features may in some cases be described in individual figures, it will be appreciated that features from one figure or embodiment can be combined with features of another figure or embodiment even when the combination is not explicitly shown or explicitly described as a combination. For ease of explanation, some examples may be primarily described with reference to data communications servers configured to provide data communication services for endpoints of a plurality of different client accounts. It is understood that the various examples may be adapted for use with computer-based communications servers configured to provide various other remote services, including, but not limited to: website hosting, remote data storage, remote computing services, virtual computing environments, enterprise communications, virtual contact center, and other services.

According to certain embodiments, a data communications system can be configured to allow a client-specific control engine to dynamically modify and control the communication flow and processing at different levels within the system, including (re)routing of incoming communications. Rules of various complexity can be used for configuring network parameters. The logic used for the control of the network parameters can be based upon directives and related data shared across multiple Private Branch Exchanges (PBXs), data that can be dynamically changed, and upon rules and logic that can be defined according to multiple tiers. For example, a large company can have many different offices or store locations. Portions of the communication routing and processing can be shared across the entire company. Other portions could be shared with subsets or groups (e.g., groups based upon geographic regions or countries or based upon different company divisions). Still further portions can be set based upon individuals communicating. Such aspects can facilitate the configuration, management, and updating of the data communications system, particularly in situations where there are many thousands of extensions within the data communications system.

The data-center communications server described herein can provide inbound and outbound communication routing for a data communications system. The data communications system can be configured as a Platform as a Service (PaaS) that provides a user with access to, among other things, telephone communication routing control, PBX functions, computer telephony integration (CTI), and data analytics (in this context the user can refer to, e.g., person, group, server or CPU, or subscribing business entity).

Similarly, client-specific sets of control data can define a manner in which endpoint devices can be controlled and/or monitored by the data communications system. For example, networked devices (e.g., IoT) can include devices for home automation (also known as smart home devices) that control automation of lighting, heating (like a smart thermostat), ventilation, air conditioning (HVAC) systems, and appliances such as washer/dryers, robotic vacuums, air purifiers, ovens, or refrigerators/freezers. The client-specific sets of control data can define a manner in which such networked devices communicate with the data communications system, a manner in which they communicate with one another, various parameters for remote monitoring of the networked devices, and the like. In some examples, the client-specific sets of control data can specify particular individuals and/or groups of individuals associated with a client entity that can access and/or control the networked devices associated with the client entity, using the data communications system.

Turning now to the figures, FIG. 1 illustrates a block diagram of an example system for context aggregation in a data communications network, consistent with the present disclosure. Data communications services can be provided for a plurality of client entities, such as via a data-center communications server. Each client entity can provide the data communications services to various endpoint devices, as can be implemented in a distributed computing environment. For instance, as illustrated in FIG. 1, a data-center communications server can host via cloud 117. A plurality of client entities can access the data-center communications server via the cloud 117, such as by a respective client entity server (e.g., client entity 1 server 101-1, client entity 2 server 101-2, and client entity 3 server 101-3).

Each of the respective client entities can be connected in one or more data networks as discussed further herein. Moreover, each of the respective client entity servers 101-1, 101-2, and 101-3 can be communicatively coupled to a plurality of communications systems. For example, client entity 1 server 101-1 can be communicatively coupled to communications systems 103-1, 103-2, and 103-3. Similarly, client entity 2 server 101-2 can be communicatively coupled to communications systems 105-1, 105-2, and 105-3. Further, client entity 3 server 101-3 can be communicatively coupled to communications systems 107-1, 107-2, and 107-3.

Although not illustrated in FIG. 1, each of the client entity servers can be communicatively coupled to a number of endpoint devices. The endpoint devices can include data communications-enabled devices (e.g., IP phones, smart phones, tablets, and/or desktop computers with appropriate data communications software applications) and/or non-data communications endpoint devices (e.g., plain old telephone service (POTS) telephones and cellular-capable devices). Each endpoint device is respectively associated with an account of a respective client. Endpoint devices can be associated with a particular client account by registering the endpoint device with a particular client account serviced by the data communications server. Registered devices for each client account can be listed in a respective account settings file (not shown) stored by a data-center communications server.

The system illustrated in FIG. 1 further includes one or more processing circuits configured to implement client-specific control engines, which are configured to adjust the data communications provided for each client account according to a respective set of control directives. For instance, the client-specific control engines can adjust a manner in which network parameters are configured to change performance of subsequent user-data communications between the client station and the participating station, based on patterns identified in the operational statistics and the aggregated context information, by accessing client-specific instructions stored in at least one client-specific database 121.

The server-based communications system illustrated in FIG. 1 can facilitate determination of a context for aggregated communications, consistent with the present disclosure. In various other related exemplary embodiments (alone and/or building on the above aspects), the context for the aggregated communications can be determined by a data-center communications server. Additionally and/or alternatively, the context for the aggregated communications can be determined by a client managed server (e.g., a client-specific communications server). In either situation, user-data communications between a client entity and another party can be retrieved from a plurality of interconnected data communications systems for a first time period. For instance, if a context between client entity 1 and Client B is to be identified, then user-data communications between client entity 1 and Client B during the first time period can be retrieved from communications systems 103-1, 103-2, and 103-3. As another illustration, if a context between client entity 2 and Client B is to be identified, then user-data communications between client entity 2 and Client B during the first time period can be retrieved from communications systems 105-1, 105-2, and 105-3.

A context can be determined for each respective user-data communication between the client entity and the other party during the first time period. The identification of the context of communications during the first time period can assist with the development of the client specific database 121, and enable machine learning to assign a context to subsequent user-data communications. As such, at 111, the context information for each respective user-data communication between the client entity and the participating entity during the first time period can be aggregated. As described herein, the context can include at least one communications-specific characteristic. For instance, once the context for previous user-data communications between client entity 1 and Client B are determined (e.g., during the first time period), then user-data communications between client entity 1 and Client B during the second time period can be retrieved from communications systems 103-1, 103-2, and 103-3. Aspects of each user-data communication can be identified, and aggregated at 113. As an illustration, keywords such as "pleased" and "happy" can be identified from an email from Client B, and the phrase "I would like to place another order" can be identified from a transcript of a voice call from Client B. These identified aspects can be combined (e.g., aggregated) to determine an overall context between Client B and client entity 1. As a further illustration, a tone from a voicemail from Client B to client entity 1 can indicate that she was very angry (e.g., the tone of her voice was short and loud), yet keywords from the same voicemail such as "I am very pleased" may be identified. Similarly, product usage records can indicate that Client B has been using her purchased services frequently. Each of these identifiable aspects can be combined (e.g., aggregated) to determine an overall context between Client B and client entity 1.

As described herein, a context can represent an overall sentiment of a relationship between at least two parties. As an illustration, a context can represent a strength of a relationship between a client that has purchased data-communications services (e.g., ABC Company), and a customer of the client (e.g., Client B). The context can be identified based on a number of factors, including keyword, phrase, and/or tone, and can be identified from a single user-data communication between the parties and/or from an aggregate of user-data communications between the parties. In embodiments where the context is determined from an aggregate of user-data communications, projections and/or predictions can be made as to the likely future context between the parties. At 115, operational statistics can be retrieved from network circuitry providing the user-data communications between the client station and the participating station, regarding performance of the user-data communications between the client station and the participating station. In various embodiments, patterns of user-data communication events corresponding to operational problems with the user-data communications between the client station and the participating station, can be identified from the retrieved operational statistics. As described herein, the operational statistics can include information regarding performance of the user-data communications between the client station and the participating station. For instance, the operational statistics can include information regarding the performance of the carrier network, and/or the performance of various network devices that provide the user-data communications on behalf of a communications service provider. Additionally and/or alternatively, the operational statistics can include information regarding measurable communication metrics associated with the user-data communications between the client station and the participating station, such as transmission latency, jitter, packet loss, and/or dropped calls.

At 115, network parameters can be configured to change performance of subsequent user-data communications between the client station and the participating station, based on patterns identified in the operational statistics and the aggregated context information. For instance, based on patterns identified in the operational statistics and the aggregated context information, a different carrier network may be selected, a different network device(s) may be selected to provide the user-data communications on behalf of a communications service provider, and/or selected network devices may be configured differently, in order to change (e.g., improve) the performance of subsequent user-data communications.

Figure 2:
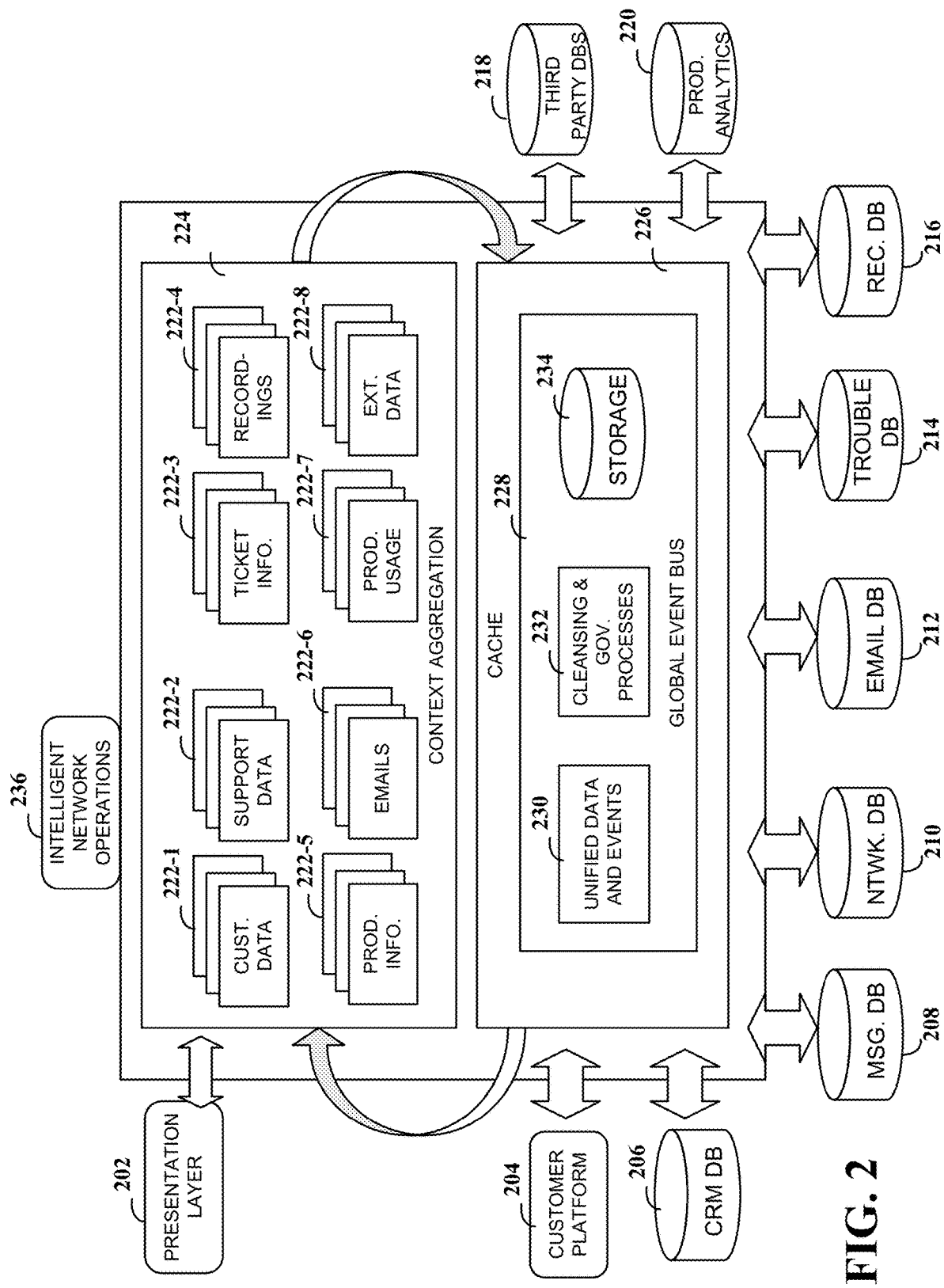
FIG. 2 illustrates a block diagram of an example system of intelligence for context aggregation, consistent with the present disclosure.

FIG. 2 illustrates a block diagram of an example system of intelligence for context aggregation, consistent with the present disclosure. The system of intelligence illustrated in FIG. 2 can be implemented by a data-center communications server hosted by a communications service provider, and/or by a client managed server hosted by a client of the communications service provider.

Data and/or information from a plurality of sources may be aggregated to determine a context between a client entity and another party. As discussed with regards to FIG. 1, each client entity can be associated with a plurality of interconnected data communications systems. For instance, each client entity can be associated with a CRM system, an email communication system, a product sales system, a text-based communications system (e.g., chat), a technological support system, and/or a data monitoring system. Examples are not so limited, and each client entity can be associated with additional and/or different communications systems beyond those listed. Additionally, the client entity and/or the communications service provider can be communicatively coupled to external (e.g., third party) systems and/or databases.

Data and/or information from each of the interconnected data communications systems can be aggregated to identify a context between a client entity and another party. Referring to FIG. 2, a cache 226 can store real-time information about all interactions involving the client entity (including the other party). For instance, a global event bus 228, stored in cache 226, can identify and record each interaction and/or event involving the client entity. A unified data and events circuit 230 can store the various data and events involving the client entity, such as emails sent and received, phone calls placed and received, chat messages, etc. A cleansing and governance processes circuit 232 can process the unified data and events as appropriate based on the content of the data. For instance, different encryption and/or data handling processes may be implemented for data and events including health data and/or financial data. A storage circuit 234 can store the various events, information regarding cleansing and governance processes, and other information.

In response to an event occurrence, such as transmission or receipt of a user-data communication, the cache 226 can be updated. Particularly, the cache 226 can be updated to include an updated context based on the aggregated communications between the client entity and the other party. For instance, the cache 226 can be communicatively coupled to a plurality of databases, including a customer platform database 204, a CRM database 206, a messaging database 208, a networking or developmental operations database 210, an email database 212, a troubleshooting database 214, a recordings database 216, a product analytics and usage database 220, and third party databases 218, among others. Data and/or information pertaining to a particular user can be retrieved from each of these databases, and stored for context aggregation, such as by a context aggregation circuit 224. As an illustration, to determine a context between Client B and ABC Company, information pertaining to customer sales and billing for Client B can be retrieved from the CRM database 206, service tickets can be retrieved from troubleshooting database 214, and transcripts of voice calls can be retrieved from the recordings database 216. Similarly, to determine a context between Client C and ABC Company, information pertaining to customer sales and billing for Client C can be retrieved from the CRM database 206, service tickets can be retrieved from troubleshooting database 214, and transcripts of voice calls can be retrieved from the recordings database 216.

In various embodiments, data and/or information from each respective database can be stored in the context aggregation circuit 224. For instance, customer data 222-1 from the customer platform 204, support data 222-2 from the network database 210, message transcripts (not illustrated in FIG. 2) from the message database 208, product information 222-5 from the CRM database 206, and emails 222-6 from the email database 212 can be stored in the context aggregation circuit 224. Additionally, service ticket information 222-3 from the troubleshooting database 214, recordings and/or transcripts from the recordings database 216, product usage and analytics 222-7 from the product analytics database 220, and external data 222-8 from third party databases 218 can be stored in the context aggregation circuit 224.

Each time that an event occurs involving the client entity and the other party, the cache 226 and context aggregation circuit 224 can be updated. For instance, each time that Client B and ABC Company interact in some way, an event record is stored in the cache 226, and the context aggregation circuit 224 is updated as appropriate. In the instance that Client B purchases a new service or product, a record from the CRM database 206 would update the cache 226, which can in turn update the product information 222-5 for Client B, and in turn update the context between Client B the ABC Company, which can be stored in storage 234. In a subsequent instance, Client B contacts ABC Company by voice and speaks with a customer service representative about a negative experience she had. In this illustration, the recording database 216 can update the cache 226, which can in turn update the recordings data 222-4 for Client B. In turn, the context for Client B and ABC Company can be updated to reflect the negative call, and the updated context can be stored in storage 234.

In various example embodiments, a presentation layer 202 can present the aggregated context in various formats. For example, circuitry configured and arranged to communicate with the system of intelligence illustrated in FIG. 2 (e.g., the cache 226 and the context aggregation circuit 224) can present a graphical user interface on a desktop computing device, mobile computing device, and/or tablet, which visually presents the context between the client entity and the other party. Using a combination of databases 204-218 and/or other network circuitry not illustrated in FIG. 2, operational statistics can be collected, retrieved, or otherwise obtained from network circuitry providing the user-data communications between the client station and the participating station, regarding performance of the user-data communications between the client station and the participating station.

In response to the operational statistics, and in response to the aggregated context information, network parameters can be configured as discussed herein. As a particular illustration, an intelligent network operations module 236 can configure network parameters to change performance of subsequent user-data communications between the client station and the participating station, based on patterns identified in the operational statistics and the aggregated context information.

Figure 3:
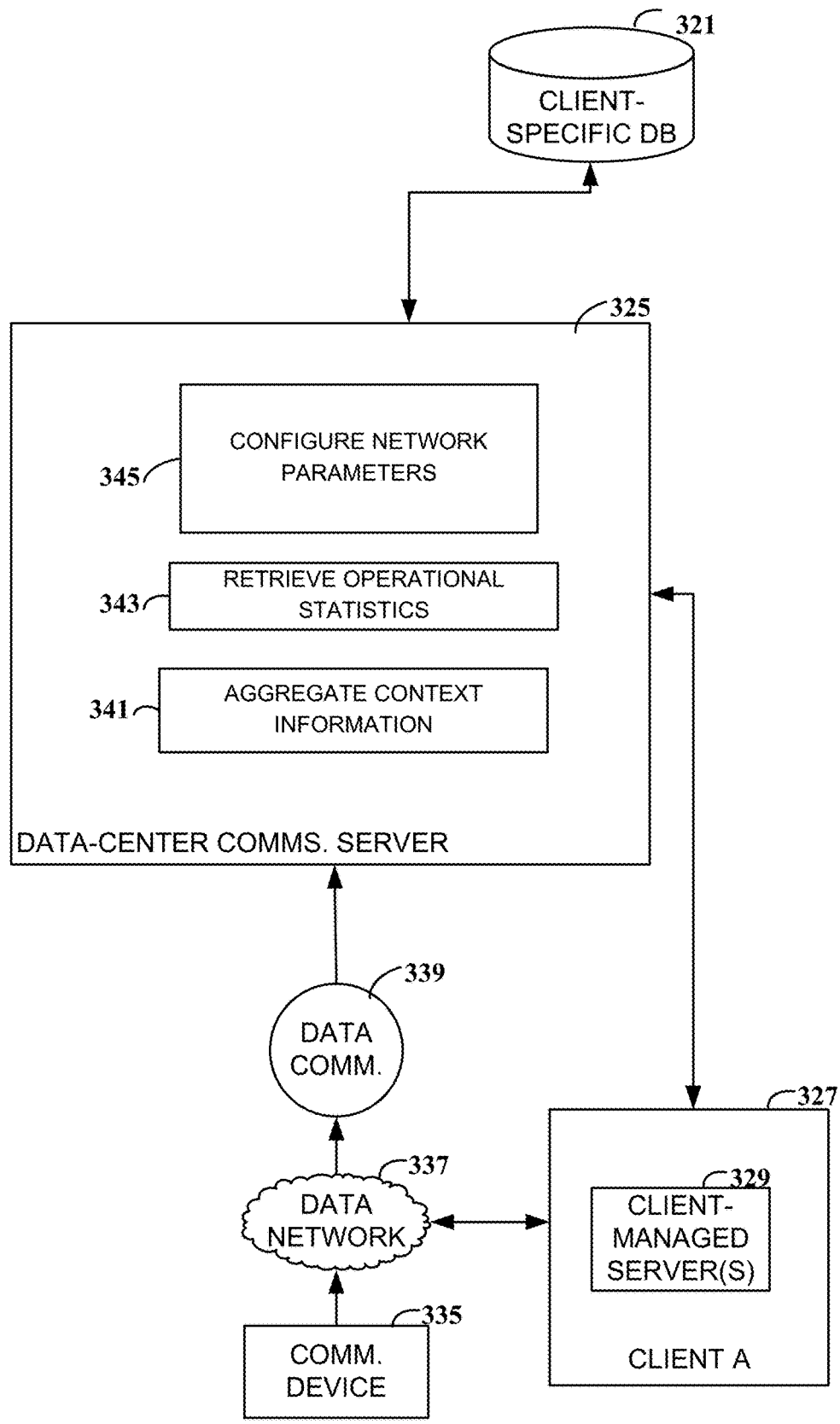
FIG. 3 illustrates a block diagram of an example system for intelligent network operations in a data communications network, consistent with the present disclosure.

FIG. 3 illustrates a block diagram of an example system for context aggregation in a data communications network, consistent with the present disclosure. For example, a data communications device 335, such as can be used by a customer of a client entity, can send a user-data communication to a client. For instance, customer Client C can call ABC Company with a question about a product that he purchased. The phone call placed by Client C (e.g., the user-data communication) can originate from Client C's device 335. Communications device 335 includes circuitry configured and arranged to facilitate data communications with client A 327, as well as a data-center communications server 325. The user-data communication (e.g., Client C's phone call) can be communicated to the client (e.g., client A 327), via a data network 337. The data network can be communicatively coupled to a data-center communications server 325, such as can be provided by a data communications server providing data communications services on a subscription basis.

Once the customer begins recording, typing, communicating, and/or generating the data communication 339, the data-center communications server can determine a context for aggregated user-data communications involving a client entity. For instance, the data-center communications server can retrieve from a plurality of interconnected data communications systems, a plurality of user-data communications between the client entity and another party. Continuing with the example above, Client C can call Client A. While Client C is on the phone with Client A, additional data-communications between Client C and Client A can be retrieved. For instance, email communications between Client C and Client A, product sales information, product support information, support ticket information, product usage information, recordings from previous voice communications, and external information associated with Client C can be retrieved. While the examples provided herein discuss a data communication including a voice call, it is noted that examples are not so limited. The data communication can include non-voice messages as well. Accordingly, the user-data communication can correspond to a user-generated audible communication or a non-voice user-generated communication. As an illustration, the non-voice user-generated communication can include an email or a text message. Examples are not so limited, however, and additional and/or different types of voice and/or non-voice user-generated communications can be received from communications device 335.

As described herein, aspects of each of the plurality of user-data communications can be identified. For instance, for each user-data communication retrieved, aspects such as a keyword, a tone, a pitch, and/or a phrase can be identified. Based on the identified aspects, a context for each user-data communication can be determined. The context can correspond with a sentiment of the respective user-data communication. As an illustration keywords and/or phrases identified from email correspondence between Client C and Client A can be associated with a positive sentiment, indicating that Client C was happy with a recent purchase. Additionally, recordings from voicemails between Client C and Client A can include keywords and a tone indicating that Client C was happy with a customer service experience. Additional data including product usage analytics can indicate that Client C is using his purchased products extensively, and has recently purchased additional services to accompany his existing services.

At 341, context information for each respective user-data communication between the client entity and the participating entity can be aggregated. As described herein, the context can correspond to at least one communications-specific characteristic. The communications-specific characteristics of the plurality of user-data communications and/or the context from each respective user-data communication can be aggregated such that a context can be assigned to the relationship between Client C and Client A. Continuing with the above example, a context can be assigned to the relationship, indicating that the relationship is strong and positive, and Client C has had an overall positive experience with Client A. In some example embodiments, the context can be represented by a number, for instance ranging from 1 to 10 where 1 indicates that the relationship between Client C and Client A is in poor health, and 10 indicates that the relationship between Client C and Client A is in good health. As another illustration, the context can be represented by a color. For instance, the color red can indicate that the relationship between Client C and Client A is in poor health, the color brown can indicate that the relationship between Client C and Client A is in slightly poor health, the color orange can indicate that the relationship between Client C and Client A is in acceptable health, the color yellow can indicate that the relationship between Client C and Client A is in slightly good health and the color green can indicate that the relationship between Client C and Client A is in good health.

In some example embodiments, the context between the client entity and the other party can be situational. As an illustration, the context between the client entity and the other party can be good, although the context between the client entity and the other party can be poor on a particular project and/or when particular individuals interact. For instance, the context between Client C and Client A can be good, though the context between Client C and, an employee of Client A can be poor. As another illustration, the context between Client C and Client A can be good, though the context between Client C and Client A with regards to Project Purple can be acceptable.

At 343, the server 325 can retrieve operational statistics from network circuitry providing the user-data communications between the client station and the participating station, regarding performance of the user-data communications between the client station and the participating station. As described herein, the operational statistics (e.g., referred to herein as communications quality factors or measurable communication metrics) can include information regarding performance of the user-data communications between the client station and the participating station. For instance, the data-center communications server can retrieve operational statistics regarding the performance of the carrier network, and/or the performance of various network devices that provide the user-data communications on behalf of a communications service provider. Additionally and/or alternatively, the data-center communications server can retrieve measurable communication metrics associated with the user-data communications between the client station and the participating station, including transmission latency, jitter, packet loss, and/or dropped calls.

In various embodiments, the context for the plurality of user-data communications (e.g., the aggregated user-data communications) can be determined, such as based on a comparison of the aggregated identifiable aspects and context information stored in a client-specific database 321. The data-center communications server 325 can serve a number of different client entities, and each respective client entity can specify different conditions under which a particular context would be assigned to a particular relationship. For instance, Client A 327 can be located in one country where a particular set of keywords are considered defamatory, whereas Client B (not illustrated in FIG. 3) can be located in a different country where the same set of keywords are not considered defamatory. Accordingly, a different set of conditions to associate particular contexts to user-data communications can be used by different client entities, and the associations between different identifiable aspects and contexts can be stored in a client-specific database such as database 321. As such, the data-center communications server 325 can be configured and arranged to provide to each respective client entity, an option to specify a plurality of identifiable aspects that can be identified from user-data communications, and at least one context associated each of the plurality of identifiable aspects.

In various example embodiments, at 345, the data-center communications server 325 can configure network parameters to change performance of subsequent user-data communications between the client station and the participating station, based on patterns identified in the operational statistics and the aggregated context information, as described herein. Each client entity can specify various associations between different identifiable aspects and contexts, and each client entity can specify processes to be implemented when the context between the client entity and the other party meets a particular threshold and/or particular criteria. Such processes can also be stored in the client-specific database 321, and can be implemented by client-specific control engine(s).

In various example embodiments, the data-center communications server 325 is configured and arranged to determine a context for aggregated user-data communications involving the client entity, by receiving from an end-user associated with the client entity, feedback indicating an extent to which the context for the plurality of user-data communications correspond with a sentiment of the plurality of user-data communications and updating the client-specific database for the associated client entity, in accordance with the received feedback. For instance, a client-specific communications server (e.g., client-managed server 329) can be configured and arranged to route data communications for a plurality of end-users having respective data communication devices. The data-center communications server 325 can periodically request feedback from the end-users associated with data communication devices regarding the accuracy of the context of various user-data communications. Based on the feedback, the client-specific database 321 can be updated to reflect the context.

Figure 4:
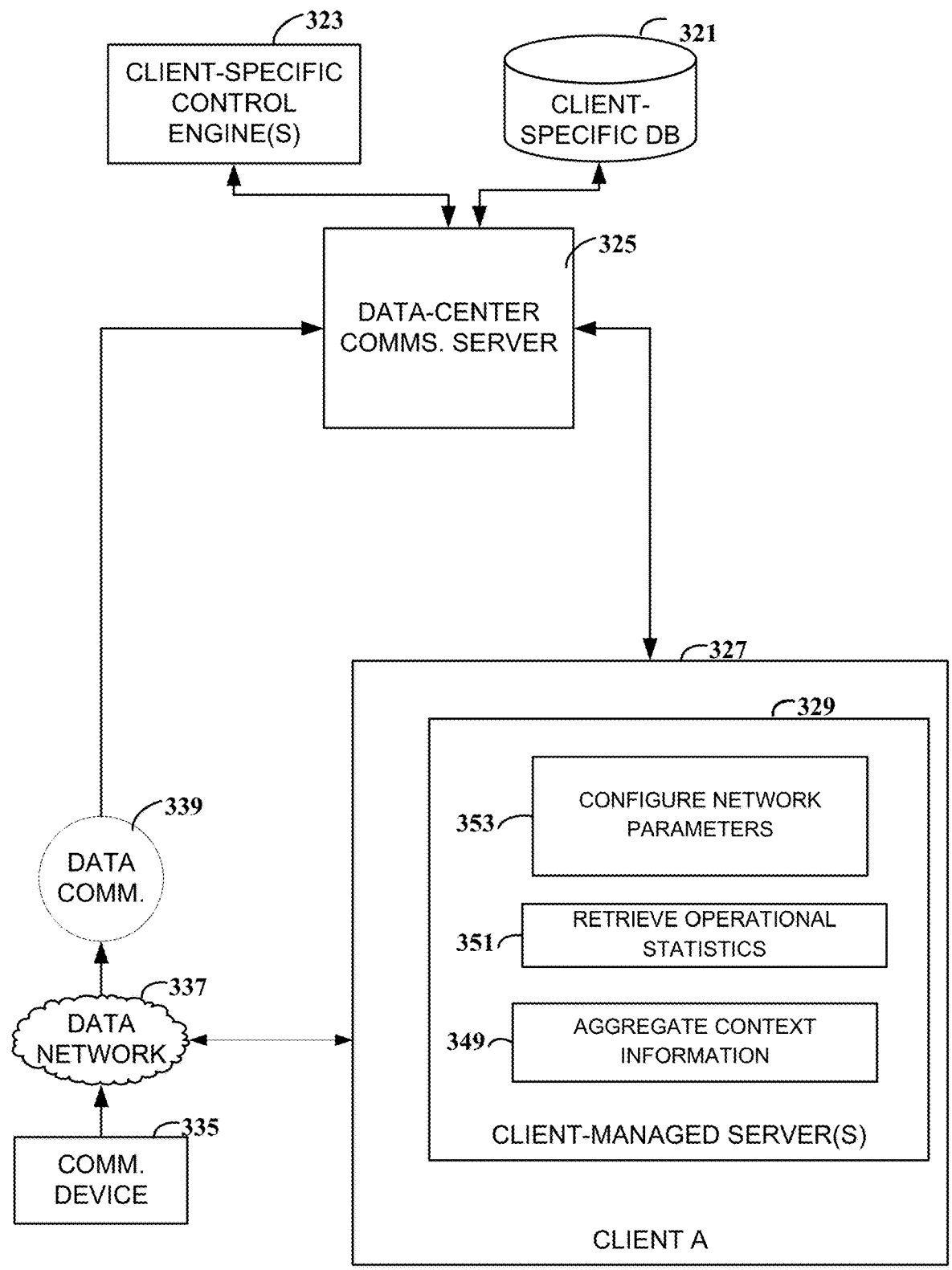
FIG. 4 illustrates an additional flow diagram illustrating an example method for intelligent network operations in a data communications network, consistent with embodiments of the present disclosure.

FIG. 4 illustrates an additional flow diagram illustrating an example method for context aggregation in a data communications network, consistent with embodiments of the present disclosure. For example, a data communications device 335, such as can be used by a customer of a client entity, can send a user-data communication to a client. For instance, customer Client C can call ABC Company with a question about a product that he purchased. The phone call placed by Client C (e.g., the user-data communication) can originate from Client C's device 335. Communications device 335 includes circuitry configured and arranged to facilitate data communications with client A 327, as well as a data-center communications server 325. The user-data communication (e.g., Client C's phone call) can be communicated to the client (e.g., client A 327), via a data network 337. The data network can be communicatively coupled to a data-center communications server 325, such as can be provided by a data communications server providing data communications services on a subscription basis.

Once the customer (e.g., Client C) begins recording, typing, communicating, and/or generating the data communication 339, the client-managed server 329 can determine a context for aggregated user-data communications involving a client entity. For instance, the client-managed server 329 can retrieve from a plurality of interconnected data communications systems, a plurality of user-data communications between the client entity and another party. Continuing with the example above, Client C can call Client A. While Client C is on the phone with Client A, additional data-communications between Client C and Client A can be retrieved via client-managed server 329. For instance, support tickets associated with Client C, recordings of phone calls from Client C, emails from Client C, and/or external information associated with Client C can be retrieved.

As described herein, aspects of each of the plurality of user-data communications can be identified. For instance, for each user-data communication retrieved, aspects such as a keyword, a tone, a pitch, and/or a phrase can be identified. Based on the identified aspects, a context for each user-data communication can be determined. The context can correspond with a sentiment of the respective user-data communication. As an illustration keywords and/or phrases identified from email correspondence between Client C and Client A can be associated with a positive sentiment, indicating that Client C was happy with a recent purchase. Additionally, recordings from voicemails between Client C and Client A can include keywords and a tone indicating that Client C was happy with a customer service experience. Additional data including product usage analytics can indicate that Client C is using his purchased products extensively, and has recently purchased additional services to accompany his existing services.

The identifiable aspects (e.g., communications-specific characteristics) of the plurality of user-data communications and/or the context from each respective user-data communication can be aggregated at 349 such that a context can be assigned to the relationship between Client C and Client A. As discussed previously, context information for each respective user-data communication between the client entity and the participating entity can be aggregated, where the context corresponds to at least one communications-specific characteristic. Continuing with the above example, a context can be assigned to the relationship, indicating that the relationship is strong and positive, and Client C has had an overall positive experience with Client A. In some example embodiments, the context can be represented by a number, for instance ranging from 1 to 10 where 1 indicates that the relationship between Client C and Client A is in poor health, and 10 indicates that the relationship between Client C and Client A is in good health. As another illustration, the context can be represented by a color.

In some example embodiments, the context between the client entity and the other party can be situational. As an illustration, the context between the client entity and the other party can be good, although the context between the client entity and the other party can be poor on a particular project and/or when particular individuals interact. For instance, the context between Client C and Client A can be good, though the context between Client C and an employee of Client A can be poor. As another illustration, the context between Client C and Client A can be good, though the context between Client C and Client A with regards to Project Purple can be acceptable.

In various embodiments, at 351 the server 329 can retrieve operational statistics from network circuitry providing the user-data communications between the client station and the participating station, regarding performance of the user-data communications between the client station and the participating station. As described herein, the operational statistics (e.g., referred to herein as communications quality factors or measurable communication metrics) can include information regarding performance of the user-data communications between the client station and the participating station. For instance, the server 329 can retrieve operational statistics regarding the performance of the carrier network, and/or the performance of various network devices that provide the user-data communications on behalf of a communications service provider. Additionally and/or alternatively, the server 329 can retrieve measurable communication metrics associated with the user-data communications between the client station and the participating station, including transmission latency, jitter, packet loss, and/or dropped calls.

In various example embodiments, at 353, the server 329 can configure network parameters to change performance of subsequent user-data communications between the client station and the participating station, based on patterns identified in the operational statistics and the aggregated context information, as described herein. Each client entity can specify various associations between different identifiable aspects and contexts, and each client entity can specify processes to be implemented when the context between the client entity and the other party meets a particular threshold and/or particular criteria. Such processes can also be stored in the client-specific database 321, and can be implemented by client-specific control engine(s) 323.

Figure 5:
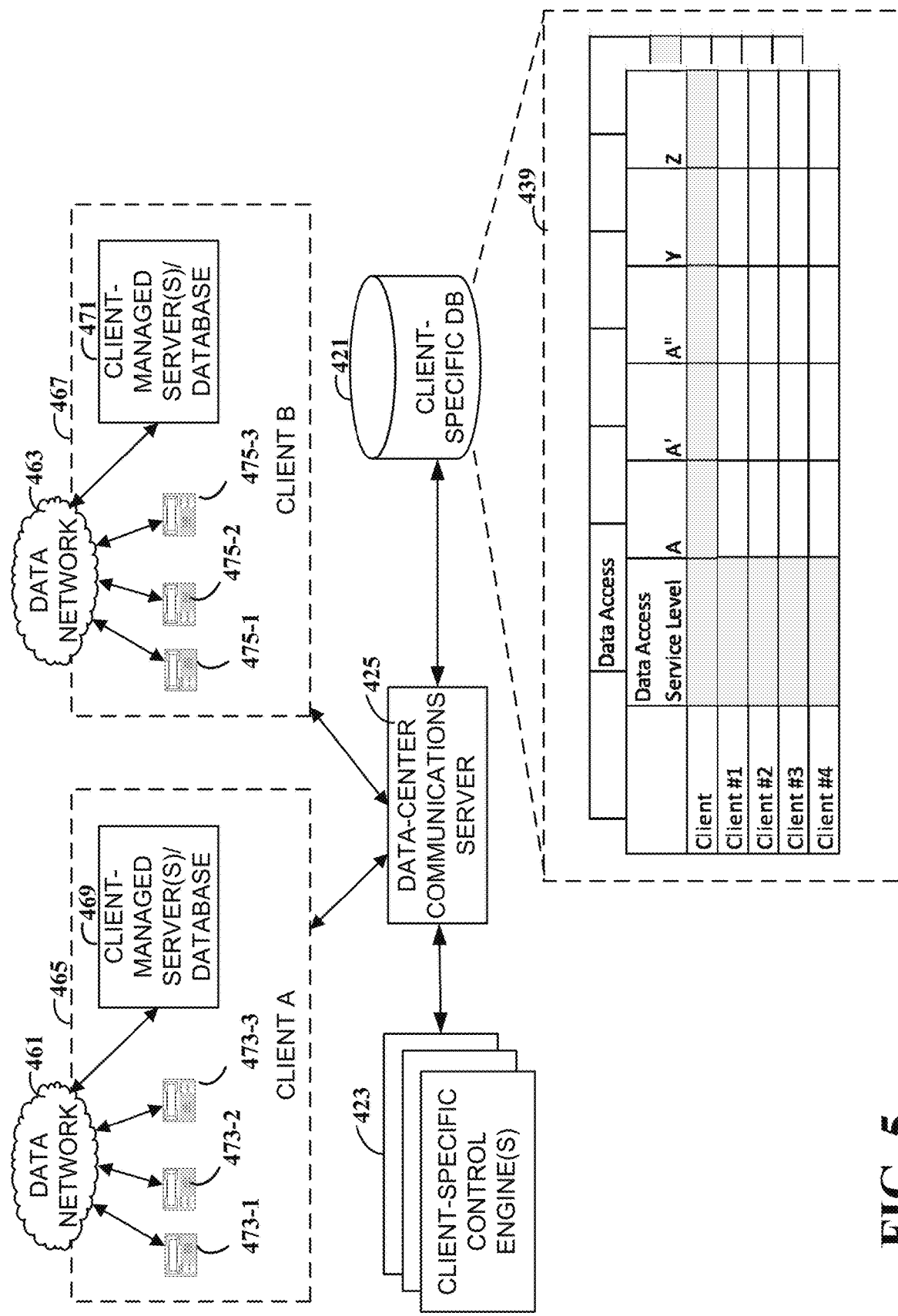
FIG. 5 illustrates a block diagram of an example data communications system for intelligent network operations, consistent with the present disclosure.

FIG. 5 illustrates a block diagram of an example data communications system for client-specific data communications monitoring, consistent with the present disclosure. The system includes a data-center communications server 425 configured to provide data communications for a plurality of endpoint devices 473-1, 473-2, 473-3, 475-1, 475-2, 475-3 connected in one or more data networks 461 and 463. The endpoint devices can include data communications-enabled devices (e.g., IP phones, smart phones, tablets, and/or desktop computers with appropriate data communications software applications) and/or non-data communications endpoint devices (e.g., plain old telephone service (POTS) telephones and cellular-capable devices). Each endpoint device is respectively associated with an account of a respective client. Endpoint devices can be associated with a particular client account by registering the endpoint device with a particular client account serviced by the data communications server. Registered devices for each client account can be listed in a respective account settings file (not shown) stored by the data-center communications server 425. In this example, endpoint devices 473-1, 473-2, and 473-3 are associated with an account 465 for a first client A and endpoint devices 475-1, 475-2, and 475-3 are associated with an account 467 for a second client B.

The system includes one or more processing circuits configured to implement client-specific control engines 423, which are configured to adjust the data communications provided for each client account according to a respective set of control directives. For instance, the client-specific control engines 423 can adjust a manner in which endpoint devices 473-1, 473-2, 473-3, 475-1, 475-2, and 475-3 are controlled, and/or a manner of routing of a data communications for a client account, by generating client-specific sets of control data to the data-center communications server 425. For example, the client-specific control engines 423 can generate client-specific sets of control data by processing the respective set of control directives for the account in response to communication event data or other data prompts received from the data-center communications server 425.

As previously described, client-specific control engines 423 can be used to facilitate control of endpoint devices associated with a client device. The control of the endpoint devices can be associated with a variety of virtual office features including, for example, data communications services such as VoIP calls, audio and/or video conferencing, IPBX exchange servers, packet switching, and traffic management as well as non-data communications services including, but not limited to, website hosting, remote data storage, remote computing services, virtual computing environments. One or more of such virtual office features can be provided, for example, by a cloud computing network having one or more servers configurable to provide a data communications system for a plurality of clients.

Each respective client entity can have a client-managed server and/or database. For instance, client A 465 can be associated with a client managed server or database 469, whereas client B 467 can be associated with a client managed server or database 471. The client-managed server can facilitate the routing of data communications between the respective endpoint devices and the data-center communications server. Similarly, the client-managed servers can, in some example embodiments, analyze the sentiment and criticality of communications sent to and/or received by the respective endpoint devices, as discussed herein. In some example embodiments, each respective client entity can have a database storing client-specific preferences correlating different sentiment scores and criticality scores with different handling processes.

Additionally and/or alternatively, the data-center communications server 425 can be communicatively coupled with a client specific database 421, storing service level subscriptions 439 for each of a plurality of client entities. For example, the data communications service provider can provide a plurality of different service levels for the clients. Each disparate service level can provide additional services and/or information to the client entity, relative to past communications handled and subsequent communications to be handled by the service provider. For example, Client A 465 and Client B 467 can be associated with a home improvement store and an adhesives manufacturer, respectively. Service level A, which can be offered to both Client A and Client B, can be associated with routing communications for Client A and Client B, and also providing information to the clients regarding customer purchase data. The purchase data can include information about how many products were purchased, when they were purchased, which products were associated with problems and/or an increased number of customer complaints, and the like. Similarly, a second service level (e.g., service level A') can include the services of the first service level (e.g., service level A), but also information on venue and regional demographics. For instance, Service level A', which can be offered to both Client A and Client B, can be associated with routing communications for Client A and Client B, providing information to the clients regarding customer purchase data, and providing information about demographic populations that are purchasing their products, demographic information about customer complaints, and demographic information about other customer service issues. A third service level (e.g., service level A") can include the services of service level A', but also information on venue and relative pricing grouping. For instance, service level A", which can be offered to both Client A and Client B, can be associated with routing communications for Client A and Client B, providing information to the clients regarding customer purchase data, providing information about demographic populations, and information regarding relative prices which each demographic population is willing to spend. Additional service levels (e.g., service level Y and service level Z illustrated in FIG. 2) can be specified. Each respective client entity (e.g., client #1 through client #4) can have a specified level of data service access provided by the data-center communications server 425.

Various blocks, modules or other circuits can be implemented to carry out one or more of the operations and activities described herein and/or shown in the figures. As examples, the Specification describes and/or illustrates aspects useful for implementing the claimed invention by way of various circuits or circuitry using terms such as blocks, modules, device, system, unit, station, controller, and the like. In these contexts, a "block" (also sometimes "logic circuitry" or "module") is a circuit that carries out one or more of these or related operations/activities (e.g., a communication control circuit). For example, in certain ones of the above-discussed embodiments, one or more modules are discrete logic circuits, computer processing circuits, or programmable logic circuits configured and arranged for implementing these operations/activities, as in the blocks shown in the figures.

Similarly, it will be apparent that a server (e.g., providing a corresponding software platform) includes a computer processing circuit that is configured to provide services to other circuit-based devices. Moreover, various other circuit-related terminology is used in a similar context as apparent to the skilled artisan, as is the case with each such apparatus which refers to or includes otherwise known circuit-based structures. As a first example, a (data communications) endpoint device (or endpoint) refers to or includes a communications circuit such as one enabled to communicate over a broadband network such as the Internet or a cellular communications network (e.g., computer) processing circuits as configured to establish data communications sessions with other endpoint devices and such endpoints include, e.g., personal computers, IP-enabled mobile phones, and tablet computers. Also, a client entity (aka "client station") refers to or includes an endpoint device (as above) which is linked/associated with a client of a provider/operator of the company overseeing the data-communications server or data-center communications server. Further, a data-center communications server or data-communications server refers to or includes a computer processing circuit that is configured to provide data-communications services to other circuit-based devices. In certain embodiments, such a processing circuit is one or more computer processing circuits programmed to execute a set (or sets) of instructions (and/or configuration data). The instructions (and/or configuration data) can be in the form of software stored in and accessible from a memory circuit, and where such circuits are directly associated with one or more algorithms (or processes). Activities pertaining to such algorithms are not necessarily limited to the specific flows such as shown in the flow charts illustrated in the figures (e.g., where a circuit is programmed to perform the related steps, functions, operations, activities, etc., the flow charts are merely specific detailed examples). The skilled artisan would also appreciate that different (e.g., first and second) modules can include a combination of a central processing unit (CPU) hardware-based circuitry and a set of computer-executable instructions, in which the first module includes a first CPU hardware circuit with one set of instructions and the second module includes a second CPU hardware circuit with another set of instructions.

Certain embodiments are directed to a computer program product (e.g., nonvolatile memory device), which includes a machine or computer-readable medium having stored thereon, instructions which may be executed by a computer (or other electronic device) that includes a computer processor circuit to perform these operations/activities. For example, these instructions reflect activities or data flows as may be exemplified in figures, flow charts, and the detailed description.

Based upon the above discussion and illustrations, those skilled in the art will readily recognize that various modifications and changes may be made to the various embodiments without strictly following the exemplary embodiments and applications illustrated and described herein. For example, although aspects and features may in some cases be described in individual figures, it will be appreciated that features from one figure can be combined with features of another figure even though the combination is not explicitly shown or explicitly described as a combination. Such modifications do not depart from the true spirit and scope of various aspects of the disclosure, including aspects set forth in the claims.

What is claimed is:

1. An apparatus, comprising:
a management circuit configured and arranged to correlate communications-specific characteristics of user-data communications involving at least one client station among a plurality of remotely-situated client stations with a particular context; and
a data-center communications server configured and arranged to provide data-communications services to the client stations, wherein the data-center communications server is configured and arranged to:
aggregate context information for each respective user-data communication between a client station among the plurality of client stations and a participating station external to the client station, the context information corresponding to at least one communications-specific characteristic;
retrieve operational statistics from network circuitry providing the user-data communications between the client station and the participating station, regarding performance of the user-data communications, associated with the data-communications services, between the client station and the participating station; and
configure network parameters to change performance of subsequent user-data communications between the client station and the participating station, based on patterns identified in the operational statistics and the aggregated context information,
wherein the data-center communications server is to predict one or more operational problems in providing the user-data communications between the client station and the participating station based on the identified patterns, and to configure the network parameters to optimize performance of the subsequent user-data communications in response to the predicted operational problems.

2. The apparatus of claim 1, wherein the data-center communications server is to retrieve measurable communication metrics associated with quality of the user-data communications between the client station and the participating station, the metrics including at least one of transmission latency, jitter, packet loss, and dropped calls, and the data-center communications server is also to configure network parameters by configuring at least one of: selection of a carrier network, selection of at least one network device to provide the user-data communications on behalf of a communications service provider, and configuration of selected network devices configured and arranged to provide the user-data communications on behalf of the communications service provider.

3. The apparatus of claim 1, wherein the data-center communications server is configured and arranged to predict the operational problems in near real-time, and configure the network parameters to optimize performance of the subsequent user-data communications in near real-time.

4. The apparatus of claim 1, wherein the data-center communications server is configured and arranged to predict an operational problem in providing the user-data communications between the client station and the participating station based on the identified patterns, and provide an alert to a representative of the client station in response to the predicted operational problem.

5. The apparatus of claim 1, wherein the data-center communications server is configured and arranged to predict an operational problem in providing the user-data communications between the client station and the participating station based on the identified patterns, and configure the network parameters based on client-specific preferences of the client station and stored by the management circuit.

6. The apparatus of claim 5, wherein the data-center communications server is configured and arranged to configure the network parameters responsive to satisfaction of operational statistic thresholds specified by the client-specific preferences.

7. The apparatus of claim 1, wherein the data-center communications server is further to optimize performance of the subsequent user-data communications in response to the predicted one or more operational problems.

8. The apparatus of claim 1, wherein the data-center communications server is further to provide an alert to a representative of the client station in response to the predicted one or more operational problems.

9. The apparatus of claim 1, wherein the data-center communications server is further to configure the network parameters based on client-specific preferences of the client station and stored by the management circuit.

10. An apparatus, comprising:
a management circuit configured and arranged to correlate communications-specific characteristics of user-data communications involving at least one client station among a plurality of remotely-situated client stations with a particular context; and
a data-center communications server configured and arranged to provide data communications services to the client stations, wherein the data-center communications server is configured and arranged to:
aggregate context information for each respective user-data communication between a client station among the plurality of client stations and a participating station external to the client station, the context information corresponding to at least one communications-specific characteristic;
retrieve operational statistics from network circuitry providing the user-data communications between the client station and the participating station, regarding performance of the user-data communications between the client station and the participating station;
retrieve operational statistics regarding performance of at least one carrier network operating to provide the user-data communications between the client station and the participating station, and identify patterns of user-data communication events corresponding to operational problems with the carrier network; and
configure network parameters to change performance of subsequent user-data communications between the client station and the participating station, based on patterns identified in the operational statistics and the aggregated context information.

11. The apparatus of claim 10, wherein the data-center communications server is configured and arranged to select a different carrier network to provide the user-data communications between the client station and the participating station based on the identified patterns.

12. An apparatus, comprising:
a management circuit configured and arranged to correlate communications-specific characteristics of user-data communications involving at least one client station among a plurality of remotely-situated client stations with a particular context; and
a data-center communications server configured and arranged to provide data communications services to the client stations, wherein the data-center communications server is configured and arranged to:
aggregate context information for each respective user-data communication between a client station among the plurality of client stations and a participating station external to the client station, the context information corresponding to at least one communications-specific characteristic;
retrieve operational statistics from network circuitry providing the user-data communications between the client station and the participating station, regarding performance of the user-data communications between the client station and the participating station; retrieve operational statistics regarding performance of at least one network device configured and arranged to provide the user-data communications on behalf of a communications service provider, and identify patterns of user-data communication events corresponding to operational problems with the at least one network device; and
configure network parameters to change performance of subsequent user-data communications between the client station and the participating station, based on patterns identified in the operational statistics and the aggregated context information.

13. The apparatus of claim 12, wherein the data-center communications server is configured and arranged to select a different network device to provide the user-data communications between the client station and the participating station based on the identified patterns.

14. An apparatus, comprising:
a management circuit configured and arranged to correlate communications-specific characteristics of user-data communications involving at least one client station among a plurality of remotely-situated client stations with a particular context; and
a data-center communications server configured and arranged to provide data communications services to a plurality of remotely-situated client stations, wherein the data-center communications server is configured and arranged to:
retrieve from a plurality of disparate interconnected data communications systems, information relating to user-data communications involving one of the client stations and a participating station external to the one client station, wherein the data communications systems each provide at least one of the data communications services to the client station;
aggregate context information for each respective user-data communication between the client station and the participating station, the context information corresponding to at least one communications-specific characteristic;
retrieve operational statistics from network circuitry providing the user-data communications between the client station and the participating station, regarding performance of the user-data communications between the client station and the participating station, and retrieve measurable communication metrics associated with quality of the user-data communications between the client station and the participating station;
identify from the retrieved operational statistics, patterns of user-data communication events corresponding to one or more operational problems with the user-data communications between the client station and the participating station;
configure network parameters to change performance of subsequent user-data communications between the client station and the participating station, based on the identified patterns and the aggregated context information, wherein the data-center communications server is to identify the patterns of user-data communication events based on a correlation of the measurable communication metrics with the user-data communication events, and predict the one or more operational problems in providing the user-data communications associated with the client station;
predict an operational problem in providing the user-data communications between the client station and the participating station based on the identified patterns; and
provide an alert to a representative of the client station in response to the predicted operational problem.

15. The apparatus of claim 14, wherein the data-center communications server is configured and arranged to:

measure a plurality of communications quality factors for data communications implemented using the data-center communications server; and isolate perceived operational problems associated with input and output circuits from transmission related data communications.

16. The apparatus of claim 15, wherein the data-center communications server is configured and arranged to select different network elements for a subsequent data communication using an algorithm based upon the aggregated context information and the isolated perceived operational problems.

17. In a communications system involving a data-communications server operated by a data-communications services provider and a client-managed server associated with a client for which the data-communications services are provided, a method of context aggregation for the data communications between the data-communications server and the client-managed server, the method comprising:

the data-communications server operating to:
provide to a plurality of remotely-situated client stations each respectively configured and arranged to interface with the data-communications server, data communications services on a subscription basis;

retrieve from a plurality of disparate interconnected data-communications systems, information relating to user-data communications involving a client-specific endpoint and another participating endpoint, wherein the client-specific endpoint is associated with one of the client stations, and the other participating endpoint is associated with a participating station external to the one client station, and wherein the data-communications systems each provide at least one of the data-communications services to the client station;

aggregate context information for each respective user-data communication between the client station and the participating station, the context information corresponding to at least one communications-specific characteristic;

retrieve measurable communication metrics from network circuitry providing the user-data communications between the client station and the participating station, regarding performance of the user-data communications between the client station and the participating station;

identify from the measurable communication metrics, patterns of user-data communication events corresponding to operational problems with the user-data communications between the client station and the participating station; and configure network parameters to change performance of subsequent user-data communications between the client station and the participating station, based on the identified patterns and the aggregated context information, wherein the data-communications server is to identify the patterns of user-data communication events based on a correlation of the measurable communication metrics with the user-data communication events, and predict one or more operational problems in providing the user-data communications between the client station based on the identified pattern; and provide an alert to a representative of the client station in response to the one or more predicted operational problems.

18. In a communications system involving a data communications server and a client-managed server, a method of context aggregation for data communications between the data communications server and the client-managed server, the method comprising:

the data communications server operating to:
provide to a plurality of remotely-situated client stations, each respectively configured and arranged to interface with the data communications server, data communications services on a subscription basis;

retrieve from a plurality of disparate interconnected data communications systems, information relating to user-data communications involving a client-specific endpoint and another participating endpoint, wherein the client-specific endpoint is associated with one of the client stations, and the other participating endpoint is associated with a participating station external to the one client station, and wherein the data communications systems each provide at least one of the data communications services to the client station;

aggregate context information for each respective user-data communication between the client station and the participating station, the context information corresponding to at least one communications-specific characteristic;

retrieve measurable communication metrics from network circuitry providing the user-data communications between the client station and the participating station, regarding performance of the user-data communications between the client station and the participating station;

identify from the measurable communication metrics, patterns of user-data communication events corresponding to operational problems with the user-data communications between the client station and the participating station; and configure network parameters to change performance of subsequent user-data communications between the client station and the participating station, based on the identified patterns and the aggregated context information, wherein the data communications server is configured and arranged to optimize performance of subsequent user-data communications by at least one of: modifying selection of a carrier network, modifying selection of at least one network device to provide the user-data communications on behalf of a communications service provider, and configuring selected network devices used to provide the user-data communications on behalf of the communications service provider.

19. The method of claim 18, wherein the measurable communication metrics associated with the user-data communications between the client station and the participating station include at least one or a combination of: transmission latency, jitter, packet loss, and dropped calls.

20. The method of claim 19, wherein the data communications server is configured and arranged to correlate the measurable communication metrics with different user-data communication events between the client station and the participating station.

* * * * *